United States Patent [19]
Stratico

[11] Patent Number: 6,145,773
[45] Date of Patent: Nov. 14, 2000

[54] TOOL CHANGING METHODS AND APPARATUS FOR AN ARMATURE WINDING MACHINE

[75] Inventor: Gianfranco Stratico, Siena, Italy

[73] Assignee: Axis USA, Inc., Tampa, Fla.

[21] Appl. No.: 09/323,304

[22] Filed: Jun. 1, 1999

Related U.S. Application Data

[60] Provisional application No. 60/090,394, Jun. 23, 1998.

[51] Int. Cl.[7] .................................................. H02K 15/09
[52] U.S. Cl. .................................. 242/433.4; 242/433.3; 29/596
[58] Field of Search ................................. 242/433, 433.2, 242/433.3, 433.4, 448; 29/596, 605

[56] References Cited

U.S. PATENT DOCUMENTS

| | | | |
|---|---|---|---|
| 2,348,948 | 5/1944 | Allen | 242/433.3 |
| 3,231,206 | 1/1966 | Moore | 242/433.4 |
| 3,785,034 | 1/1974 | Buchotz | 242/433.4 X |
| 3,785,583 | 1/1974 | Biddison | 242/433.3 |
| 3,857,172 | 12/1974 | George et al. | 242/433.3 |
| 3,921,284 | 11/1975 | Bucholtz et al. | 242/433.3 X |
| 3,927,456 | 12/1975 | Dammar | 242/433.3 X |
| 3,927,843 | 12/1975 | Dammar | 242/433.4 |
| 4,027,827 | 6/1977 | Biddison | 242/433.3 |
| 4,153,985 | 5/1979 | Hibbard | 242/433.3 |
| 4,708,297 | 11/1987 | Boers | 242/433.4 |
| 4,768,727 | 9/1988 | Santandrea | 242/433.3 |
| 4,915,313 | 4/1990 | Banner et al. | 242/433.4 |
| 5,127,594 | 7/1992 | Lombardi et al. | 242/433.4 |
| 5,335,868 | 8/1994 | Iwase | 242/433.3 |

*Primary Examiner*—Donald P. Walsh
*Assistant Examiner*—Emmanuel M. Marcelo
*Attorney, Agent, or Firm*—Fixh & Neave; Robert R. Jackson; Walter M. Egbert, III

[57] ABSTRACT

Apparatus and method in a motor winding machine for shielding a dynamo-electric core, including a shielding assembly including a longitudinal member defining a longitudinal axis, a first end configured to shield an end portion of the dynamo-electric core, and a second end. A coupling assembly is configured to connect the second end of the longitudinal member to a portion of the motor winding machine, while permitting relative movement therebetween in a direction perpendicular to the longitudinal axis. The shielding assembly may further include a second longitudinal member defining a longitudinal axis, a first end configured to support an end portion of the dynamo-electric core, and a second end. A second coupling assembly may be configured to connect the second end of the second longitudinal member to a portion of the motor winding machine, while permitting relative movement therebetween in a direction perpendicular to the longitudinal axis. The first and second longitudinal members are concurrently removable from the motor winding machine as a unit in a direction perpendicular to the longitudinal axis.

34 Claims, 9 Drawing Sheets

TOOL CHANGING METHODS AND APPARATUS FOR AN ARMATURE WINDING MACHINE

This application claims the benefit of U.S. provisional patent application Ser. No. 60/090,394, filed Jun. 23, 1998.

BACKGROUND OF THE INVENTION

The invention relates to a machine for winding an armature of an electric motor or a similar machine such as a generator. More particularly, this invention relates to apparatus for holding an armature in the winding machine, which can be quickly and automatically changed to accommodate a differently sized armature.

To wind the armature of a motor or generator, wire is wrapped around the armature core, i.e., in slots in the armature. The shaft of the armature must be rotated to position the slots to receive wire. This process typically is performed automatically by a conventional winding machine. The winding machine typically includes a gripping device, which holds and automatically rotates the armature shaft.

At predetermined stages of the winding process, lead wires from the armature being wound are connected to a commutator by passing the lead wires around a commutator hook or tang. To prevent the lead wires from catching onto the commutator, the gripping device which holds the shaft typically includes one or more sleeves for selectively covering the commutator hooks. The sleeve is translated along the longitudinal axis of the armature shaft to cover or expose a hook as required.

In order to perform these various tasks, devices are provided for covering or shielding the commutator of the armature, and for gripping the armature shaft. These devices need to be changed when the winder has to wind coils on a differently sized armature. Such changes are particularly required when there is a variation in the commutator size, and in the size of the armature shaft that needs to be gripped.

To increase manufacturing productivity and efficiency, changing the devices for shielding the commutator of the armature or for gripping the armature shaft should be a simple process. The change-over process should be adaptable to automation.

For example, commonly-assigned U.S. Pat. No. 5,127,594 to Lombardi et al. describes tool changing methods and apparatus for changing the collet assembly and selected sleeves of the armature holding assembly. U.S. Pat. No. 5,127,594 allows the collet assembly to be removed in an axial direction from the winding apparatus.

To increase manufacturing productivity, it would be desirable to provide a winding machine in which the apparatus for gripping an armature shaft can be changed easily and quickly.

It would also be desirable to provide a winding machine in which the gripping apparatus and the sleeves can be removed and replaced as a single assembly.

It would also be desirable to provide a winding apparatus in which the change-over of the gripping apparatus and the sleeves is adaptable to automation.

SUMMARY OF THE INVENTION

In accordance with this invention, a motor winding machine is provided with a shielding assembly for shielding a dynamo-electric core. The shielding assembly has a longitudinal member defining a longitudinal axis, a first end for shielding an end portion of the dynamo-electric core. A coupling assembly may be configured to connect the longitudinal member to a portion of the motor winding machine while permitting relative movement therebetween in a direction perpendicular to the longitudinal axis. In a preferred embodiment, the shielding assembly includes a second longitudinal member defining a longitudinal axis, a first end for supporting an end portion of the dynamo-electric core. A second coupling assembly is configured to connect the longitudinal member to a portion of the motor winding machine while permitting relative movement therebetween in a direction perpendicular to the longitudinal axis. The first and second longitudinal members may be concurrently movable with respect to the motor winding machine as a unit in the first direction perpendicular to the longitudinal axis.

In a preferred embodiment, an aligning assembly is provided for aligning the longitudinal members with respect to a single direction perpendicular to the longitudinal axis to allow concurrent movement of the longitudinal members as a unit with respect to the motor winding machine. The aligning assembly may include locking mechanism configured to releasably secure the longitudinal members against relative rotation about the longitudinal axis. The locking mechanism may be an elongated coupling member receivable in apertures in each of the longitudinal members, wherein the apertures are aligned when the securing assembly and the coupling assembly are also aligned with respect the single direction perpendicular to the longitudinal axis.

Novel methods for changing an armature holding assembly are disclosed, which include providing a shielding assembly defining a longitudinal axis and including a longitudinal member having a first end for shielding an end portion of the dynamo-electric core and a second end, providing a coupling mechanism to connect the longitudinal member and a portion of the winding machine, while permitting relative movement therebetween in a direction perpendicular to the longitudinal axis, and removing the shielding assembly from the winding machine in the first direction perpendicular to the longitudinal axis. The method may also include providing a second shielding assembly defining a longitudinal axis and including a second longitudinal member having a first end for shielding an end portion of the dynamo-electric core and a second end, aligning the second end of the second longitudinal member with respect to the coupling assembly, and attaching the second shielding assembly by moving the second longitudinal member in the first direction perpendicular to the longitudinal axis.

In a preferred embodiment, the step of providing a shielding assembly further includes providing a shielding assembly having a second elongated member having a first end for supporting an end portion of the dynamo-electric core and a second end. A second coupling mechanism is provided to connect the second longitudinal member and a portion of the winding machine, while permitting relative movement therebetween in a second direction perpendicular to the longitudinal axis. Before the step of removing the shielding assembly from the winding machine, the first longitudinal member and the second member are positioned about the longitudinal axis such that the first direction and the second direction are substantially aligned.

BRIEF DESCRIPTION OF THE DRAWINGS

The above and other features of this invention, its nature, and various advantages will be apparent from the following detailed description of the preferred embodiments, taken in conjunction with the accompanying drawings, in which like reference characters represent like elements throughout, and in which.

DETAILED DESCRIPTION OF PREFERRED EMBODIMENTS

Figure 1:
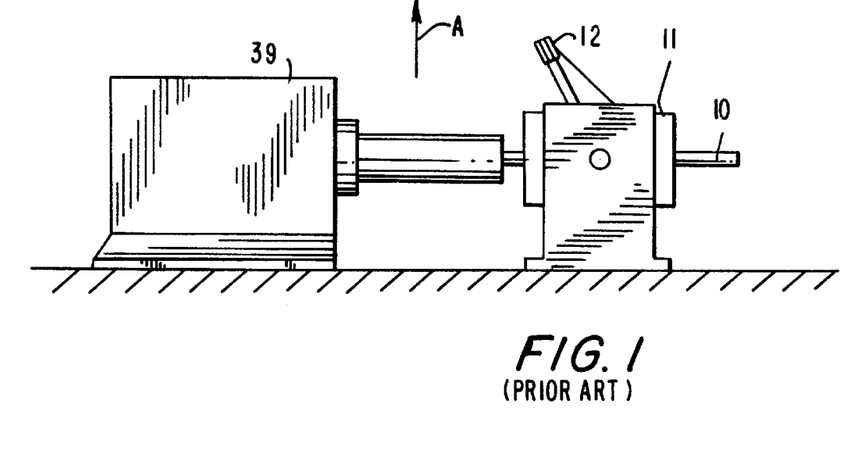
FIG. 1 is a simplified schematic representation, viewed from line 1—1 of FIG. 2, showing the position of the principal assemblies present in the flyer winder according to the invention.
Figure 2:
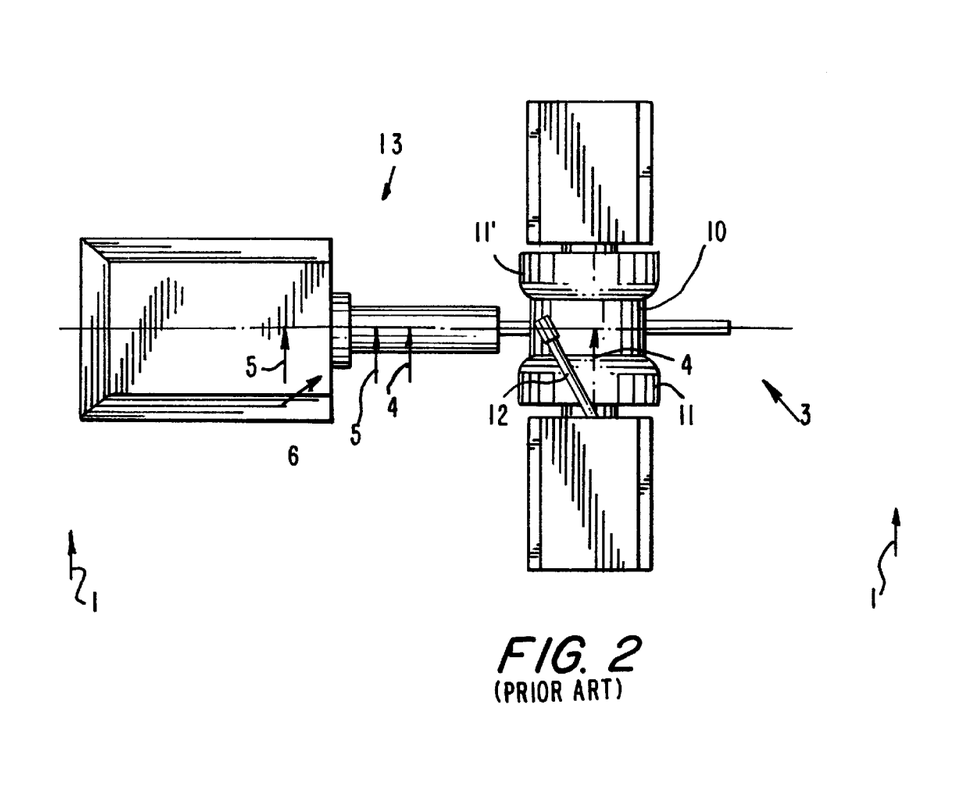
FIG. 2 is a simplified schematic plan view showing the principal assemblies present in the flyer winder according to the invention.

The invention is described with respect to apparatus for winding an armature. However, it is understood that the invention may be used to wind dynamo-electric cores, such as brushless stators. With reference to FIGS. 1 and 2, the dynamo-electric core, such as armature 10, is positioned between opposite shrouds 11 and 11', which guide wire being delivered by flyers 12 and 12' (not shown, although substantially identical to flyer 12). The wires are guided into slots of the armature stack to form the actual coils. The armature winding machine, as is known in the art, includes, for example, the shrouds 11 and 11', the flyers 12 and 12', the support structure 39, and unit 13 (described in greater detail below), and all other equipment necessary to wind coils to the dynamo-electric core, such as armature 10. Unit 13 is designed to be movable with respect to the armature winding machine in a direction A, for ease of removal and mounting, as will be described below.

Figure 3:
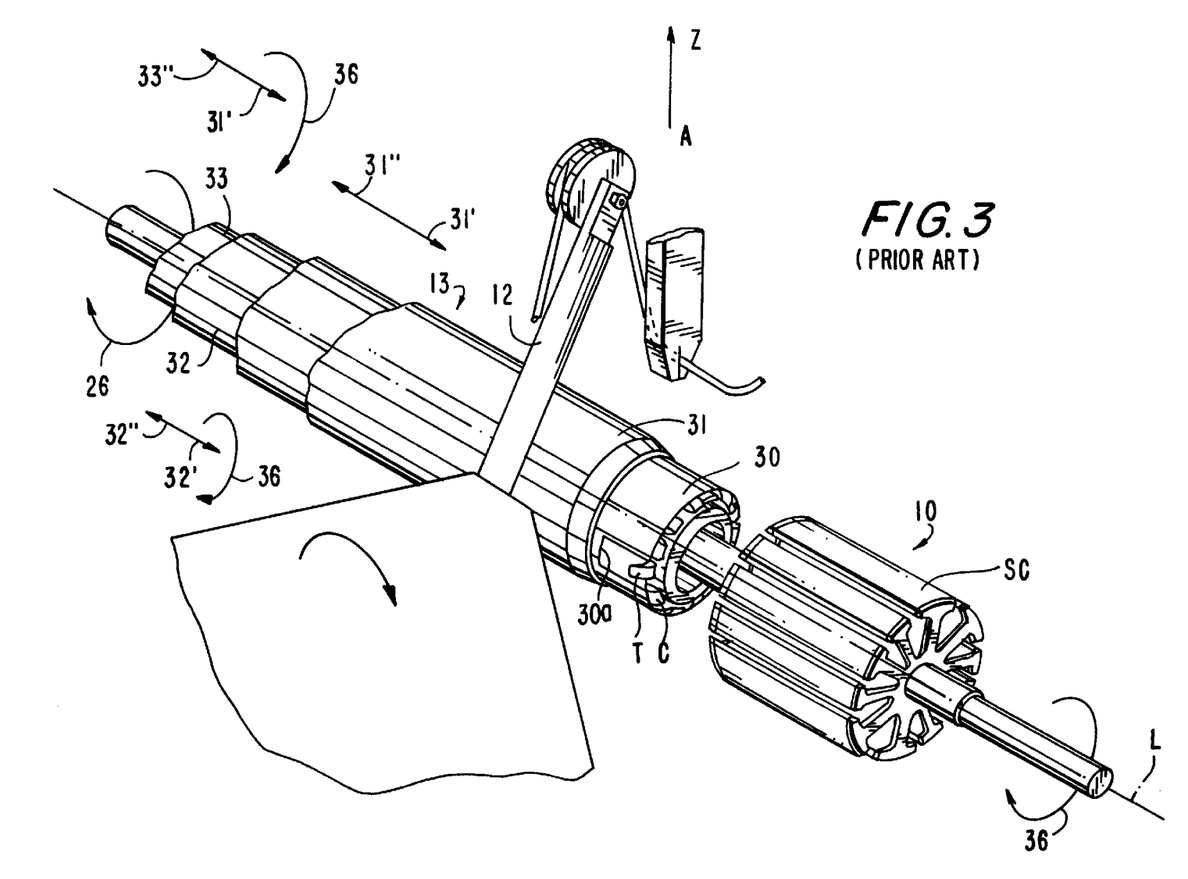
FIG. 3 is an enlarged partial perspective view taken from direction 3 of FIG. 1, showing the armature, and shielding and gripping apparatus according to the invention.
Figure 4:
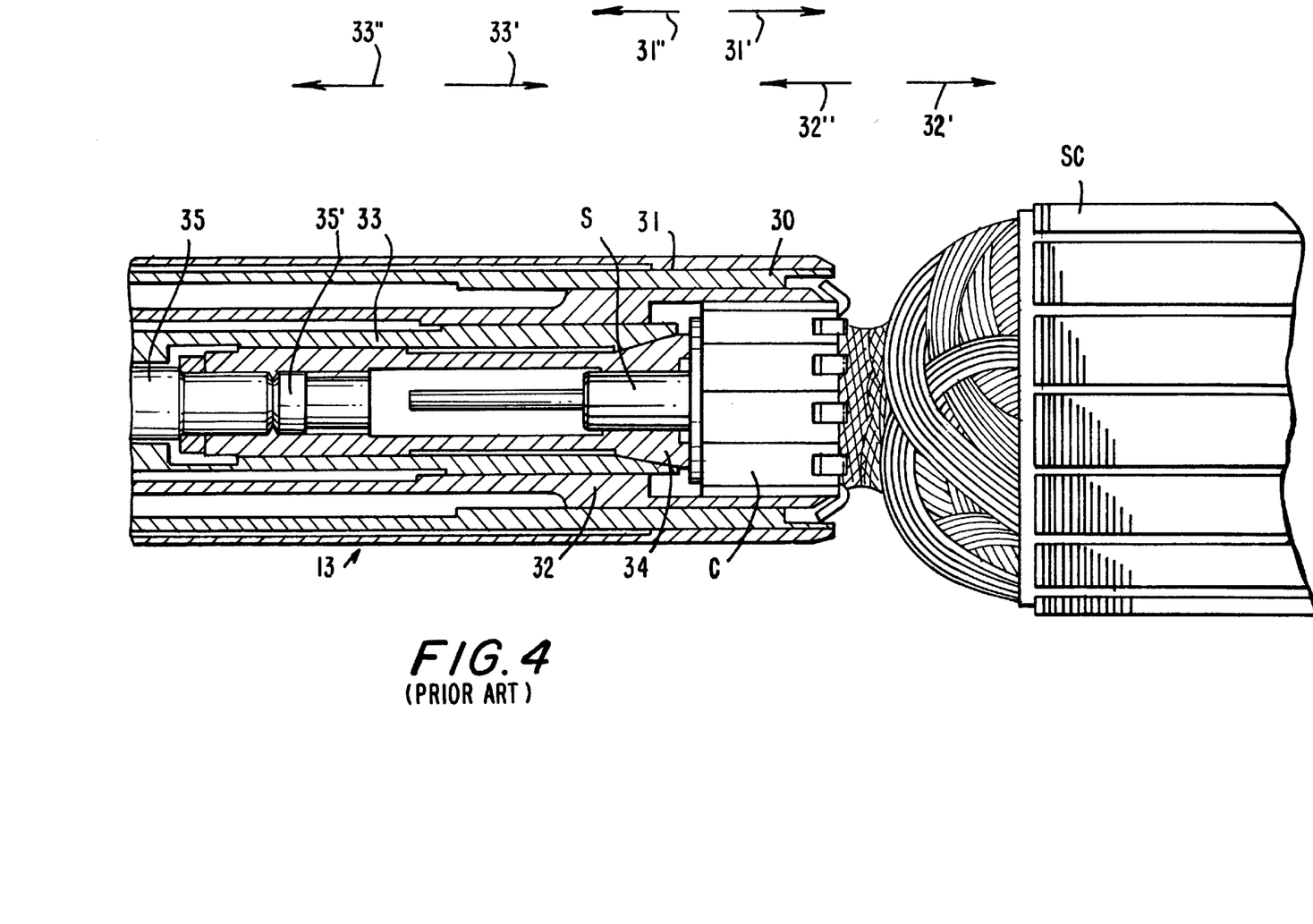
FIG. 4 is an enlarged partial longitudinal section view, taken along line 4—4 of FIG. 1, illustrating the shielding and gripping apparatus according to the invention.

As illustrated in FIGS. 3 and 4, unit 13 contains the interchangeable devices for shielding the commutator C during winding, and for gripping the shaft S of the armature, so that the armature stack SC is correctly positioned between the shrouds 11 and 11'. Tube 30 shields the tangs of commutator C during operations of the winder. Tube 30 does not move when mounted in the winder, and has openings, such as opening 30a, which expose corresponding tang T to receive attachment of a wire lead.

Tube 31 surrounds tube 30, and is capable of translating parallel to the armature's longitudinal shaft S in directions 31' and 31,", respectively, to cover and to uncover the tangs T exposed by tube 30.

As illustrated in greater detail in FIG. 4, tube 32 is within tube 30, and pushes and maintains the leads behind the tangs. Tube 32 translates in directions 32' and 32", respectively, to push the leads behind the tangs, and to come away from pushing the leads behind the tangs.

Tube 33 is within tube 32, and may translate in directions 33' and 33", respectively, to close and to open gripping collet 34. Gripping collet 34 holds the shaft S of the armature 10, to position the latter during operations of the winder. Gripping collet 34 is fixed to shaft 35, for example, by a bolt connection in 35'. Tube 33, gripping collet 34 (together with shaft 35), and tube 32 can rotate in direction 36 during indexing of the armature in the winder.

Members 30, 31, 32, 33, 34 and 35 are traditional and well known to the technician of the art, with regard to the manner in which they grip and shield the armature. U.S. Pat. No. 5,241,224 to Lombardi et al., which is hereby incorporated by reference in its entirety herein, describes solutions for rapidly changing gripping and shielding members.

When a new armature having a differently sized commutator needs to be wound in the winder, tubes 30, 32, 31, 33 and gripping collet 34 (together with shaft 35) may need to be replaced. Consequently, these members are removed from the winder and replaced with substitutes having a size appropriate to the new armature.

The apparatus according to this invention allows the members, e.g., members 30, 32, 31, 33 and 34, to be removed and replaced in the winder as a unit, (i.e., all of them at the same time), therefore without disjoining them, and in direction A perpendicular to the longitudinal axis (i.e., towards unoccupied area Z of the winder). In this way, the time required to change these members can be reduced, the operations to substitute them can be simplified, and the related changing operations may be accomplished automatically.

Figure 5:
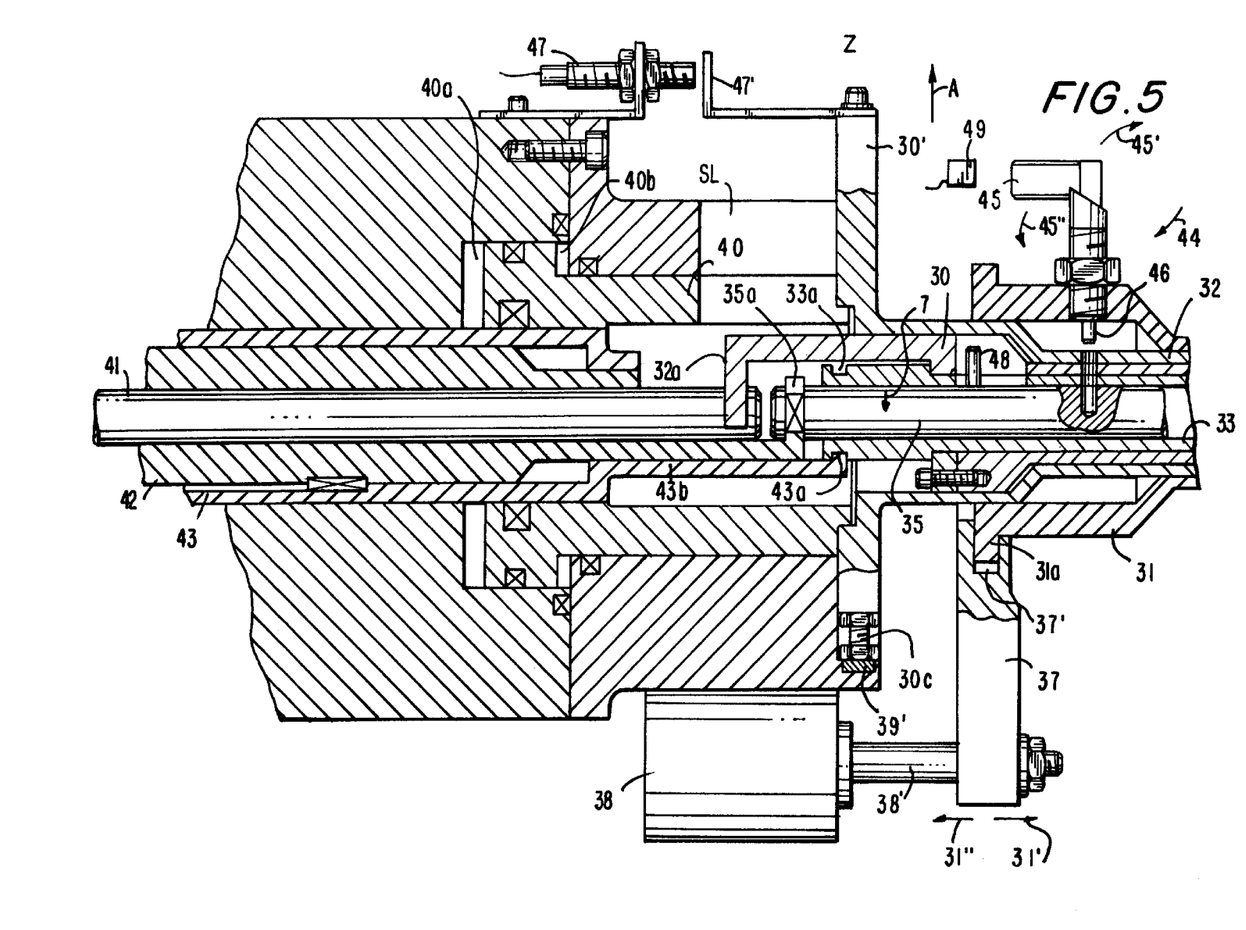
FIG. 5 is a continuation of the longitudinal section view of FIG. 4, taken along line 5—5 of FIG. 1, illustrating the shielding and gripping apparatus according to the invention.

As illustrated in FIG. 5, tube 31 is connected with bracket 37. Tube 31 may have an outwardly extending flange, or rim 31a. During normal operation of the winder, rim 31a may be seated in groove 37' of bracket 37. Bracket 37 is connected to the end of piston rod 38', which extends from air cylinder 38. Air cylinder 38 is used for causing bracket 37, and consequently tube 31, to move in directions 31' or 31", for the reasons described in the foregoing.

Figure 6:
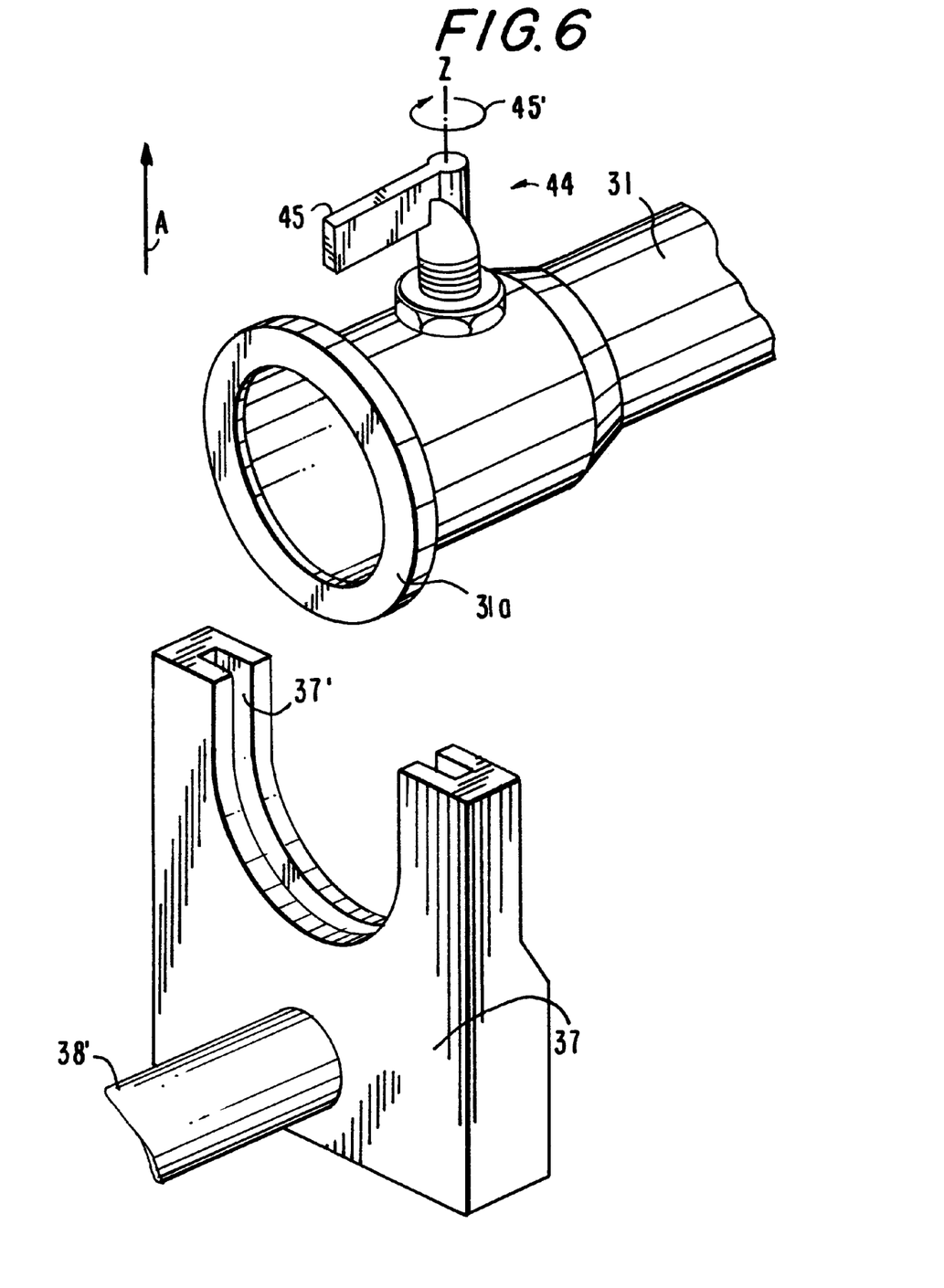
FIG. 6 is an enlarged partial perspective view taken from direction 6 of FIG. 2, illustrating the coupling of components according to the invention.

As can be seen in FIG. 6, groove 37' is partially circular, and open towards area Z. Rim 31a is shown out of groove 37', by having moved tube 31 in direction A.

Figure 7:
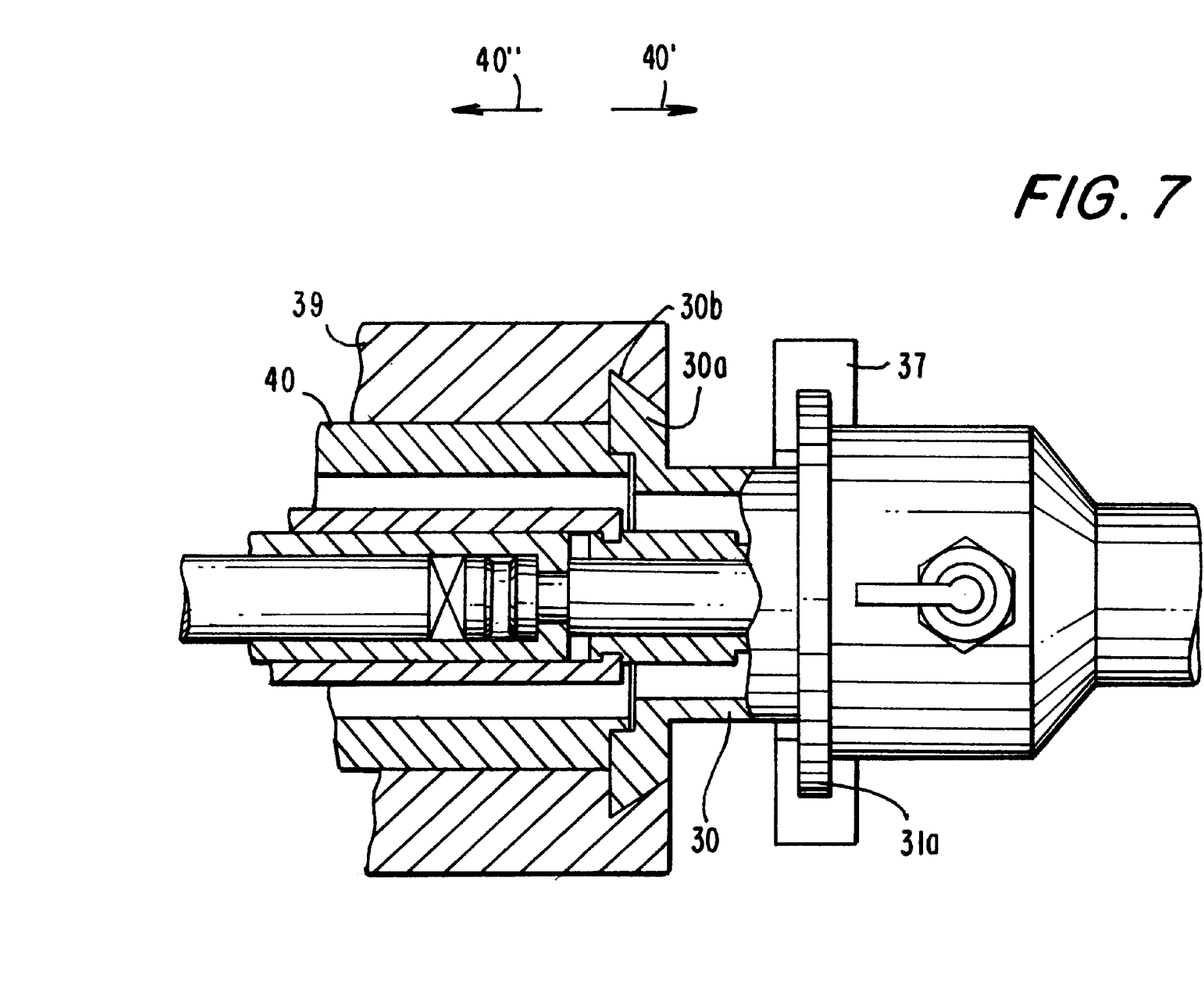
FIG. 7 is an enlarged plan view, in partial section, taken from direction 7 of FIG. 5.

FIG. 7 illustrates the mounting of tube 30 with respect to support structure 39. Tube 30 is secured to support structure with a releasable coupling assembly. For example, the end of tube 30 includes a dovetail male portion 30a inserted in a correspondingly configured groove 30b of support structure 39. The support structure 39 is fixed to the platform of the winder, as can be seen in FIG. 1.

Groove 30b is open towards area Z, so that dovetail male portion 30a of tube 30 can slide out of groove 30b, by moving tube 30 in direction A. (In FIG. 7, direction A is towards the observer, and perpendicular to the plane of FIG. 7.) When the dovetail male portion is inserted in groove 30b, the position of tube 30, in direction A, is given by registering bolt 30c (see FIG. 5), which is fixed to the bottom of dovetail male portion 30a. Registering bolt 30c abuts against surface 39' of support structure 39.

Tube 30 may be releasably secured to support structure 39. In the preferred embodiment, inner tube 40, when moved in direction 40', pushes the dovetail male portion 30a against the walls of groove 30b. This pushing action secures the dovetail male portion in grove 30b, and therefore secures tube 30 to support structure 39, in the position determined by registering bolt 30c. Inner tube 40 is actuated by air chambers 40a and 40b situated within support structure 39 (See, FIG. 5).

In an alternative embodiment of the coupling assembly for connecting tube 30 with support structure 39, dovetail mail portion 30a may be replaced by a flange portion. Flange portion of tube 30 may be substantially similar to rim 31a (FIG. 6), although flange portion of tube 30 preferably has a rectangular or prismatic outline rather than the circular outline of rim 31a. In the alternative embodiment, groove 30b may be replaced by a groove similar to groove 37' (FIG. 6) for receiving the flange of tube 30. When the flange of tube 30 has a rectangular outline, the groove will have corresponding rectangular configuration, with an opening towards area Z (See, FIG. 5).

In the alternative embodiment, inner tube 40 pushes the flange of tube 30 against the walls of the groove. The end portion of inner tube 40 may be provided with a conical configuration receivable in a corresponding funnel-opening in the end of tube 30. The pushing action of conical portion of tube 40 into the funnel-shaped portion of tube 30 secures the flange portion in the grove, and centers tube 30 within the groove as well.

Tube 32 may be releasably connected to actuating shaft 41, which is capable of translating in directions 32' and 32", for the reasons specified in the foregoing. The interconnection of these two members is shown in FIG. 5, and in FIG. 8. This connection may be made by a coupling assembly, such as an "L"-shaped structure 32a and groove 41'. "L"-shaped structure 32a is positioned at an end portion of tube 32, and attached to tube 32, for example by the use of bolts, as indicated in the FIG. The tip T of the "L"-shaped structure is received in groove 41' of shaft 41. Groove 41' is open towards area Z, therefore tube 32 can be disconnected from shaft 41, by moving the former in direction A.

Shaft 35 may be connected to actuating tube 42, which is capable of rotating in direction 36, for the reasons specified in the foregoing. The connection between actuating tube 42 and shaft 35, is shown in FIG. 5 and in FIG. 9. This connection can be made by a coupling assembly, such as neck portion 35a of shaft 35 received in slot 42a defined between flange portions 42c of tube 42, and enlarged head portion 35b of shaft 35 received in annular extension 42b of tube 42 40. Both slot 42a and annular extension 42b are open towards area Z, so that shaft 35 can be disconnected by moving it in direction A. Neck portion 35a and slot 42a have sides parallel to direction A, which prevent relative rotation between tube 42 and shaft 35, but do not prevent disconnection when there is movement of shaft 35 in direction A.

Figure 9:
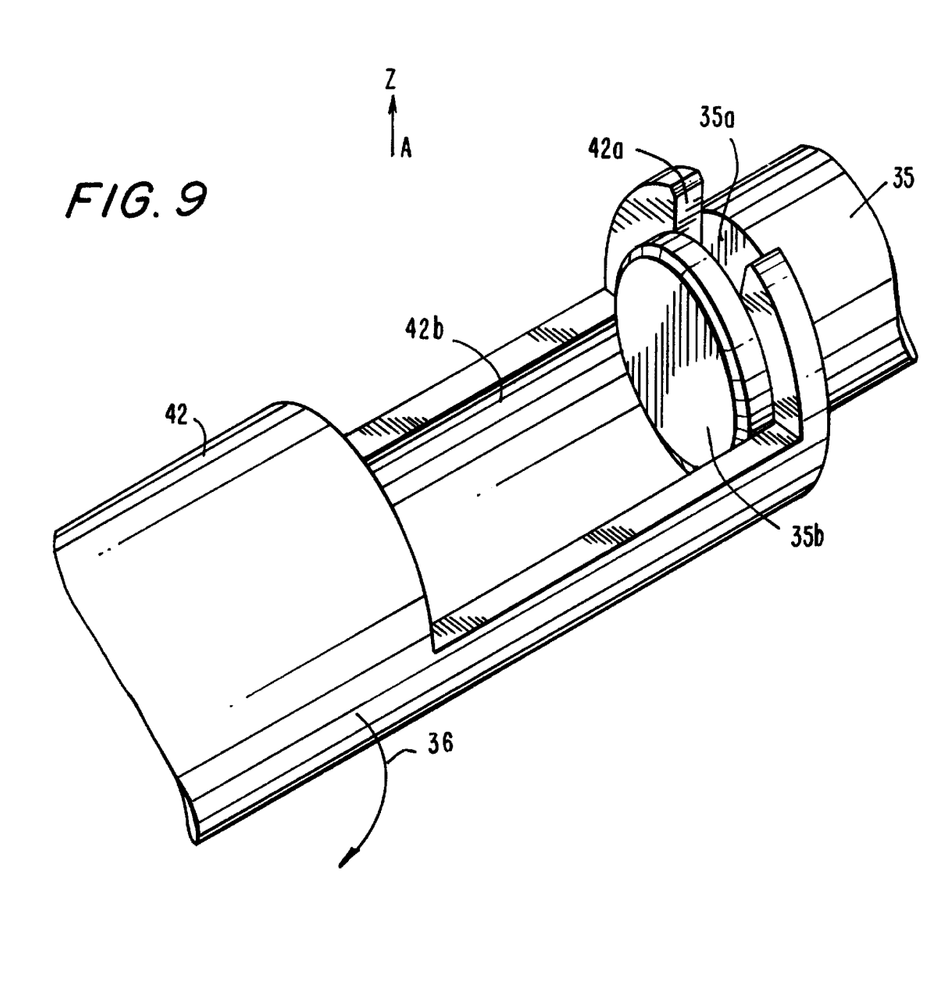
FIG. 9 is an enlarged partial perspective view, similar to FIGS. 6 and 8, taken from direction 6 of FIG. 2, illustrating yet another coupling of components according to the invention.

Tube 33 is connected to actuating tube 43 by means of a coupling assembly substantially similar to the one shown in FIG. 9. More particularly, the end of tube 33 is provided with a circular groove 33a (see FIG. 5) received in a similarly configured groove 43a of an annular extension 43b of tube 43. Groove 43a and annular extension 43b are open towards area Z. In this way, tube 33 can be disconnected by moving it in direction A.

Pin 48 extends perpendicularly from shaft 35. Pin 48 is received in slots of tubes 33 and 32. In this way, any rotation in direction 36 imparted to tube 42, can be transmitted to tubes 33 and 32, by pin 48. Moreover, the slots in tubes 33 and 32 are preferably elongated longitudinally, which may allow relative longitudinal movement between tubes 33 and 32 and pin 48.

Tubes 30, 31, 32, 33, gripping collet 34, and shaft 35 are all mounted co-axially with respect to each other, so that they support each other to move as has been described with reference to FIG. 3, and always with a position reference to tube 30, which becomes locked to support structure 39.

Figure 8:
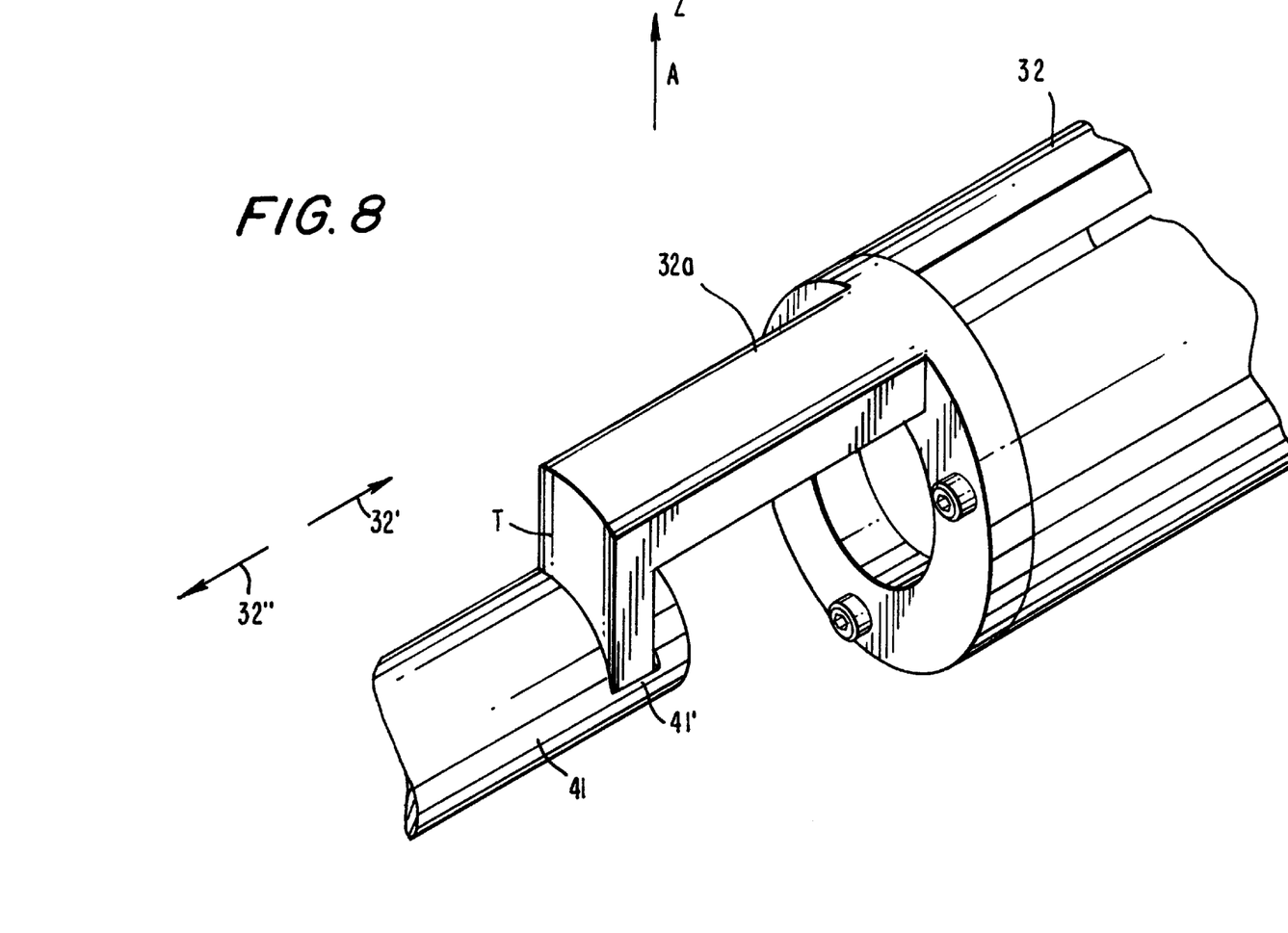
FIG. 8 is an enlarged partial perspective view, similar to FIG. 6, taken from direction 6 of FIG. 2, illustrating another coupling of components according to the invention.

As illustrated in FIG. 5, an assembly for aligning and securing the tubes, such as locking pin assembly 44, is carried by tube 31. By rotating lever 45 of the locking pin assembly in direction 45', locking pin 46 can be made to pass through aligned openings, such as bores of tubes 30, 32, 33 and of shaft 35. Alternatively, notches, grooves or other voids may be provided on these members to receive locking pin 46. Each of tubes 30, 32, 33 and shaft 35 are configured to separate from support structure 39, shafts 41, and tubes 43 and 42, respectively, in a single direction perpendicular to the longitudinal axis. Since tubes 30, 32, 33 and shaft 35 are configured for relative angular movement with respect to one another, alignment of tubes 30, 32, 33 and shaft 35 is necessary to move unit 13 in direction A with respect to the winder. More specifically, such alignment may be necessary for both the separation and attachment of tubes 30, 32, 33 and shaft 35 with respect to support structure 39, shafts 41, and tubes 43 and 42, respectively. As a result of aligning tubes 30, 32, 33 and shaft 35, the coupling devices are aligned with respect to direction A. For example, tube 32 and shaft 41 should be radially oriented such that groove 41' is directed towards direction A and region Z, such that "L"-shaped structure 32a may be removed in direction A (FIG. 8). Tube 35 and shaft 42 should be radially oriented such that the sides of neck portion 35a and slot 42a are parallel to direction A, in order to allow removal of shaft 35 in direction A (FIG. 9). This insertion of the locking pin through the bores may be required prior to removing them from the winder, and when the winder is not operating. It is understood that tubes 30, 32, 33 and shaft 35 may be removed as a unit 13 without the insertion of the locking pin through the bores. Prior to installing unit 13 in the apparatus, it is preferable to insert locking pin 46 into the bores, such that tubes 30, 32, 33 and shaft 35 are properly aligned with support structure 39, shafts 41, and tubes 43 and 42, respectively. The alignment of the constituent components of unit 13 is particularly useful when automated equipment, such as "pick and place" machines, are used to install unit 13 in place.

Furthermore, the locking pin 46 needs to be removed from these bores (by rotating lever 45 in direction 45"), after these members have been mounted in the winder, and prior to starting operations to wind. In a preferred embodiment of the invention, a sensor is provided to detect whether pin 46 has been removed from the bores, as described above. More particularly, sensor 49 detects the position of lever 45, which is used to position pin 46. When the sensor detects that lever 45 is in a position corresponding to pin 46 being removed from the bores, the sensor 49 sends a signal to apparatus that winding operations may be commenced.

By means of the connections described in the foregoing, these tubes and the shaft can be removed as a unit, by simply releasing the pushing action of tube 40 and by pulling enlarged portion 30' in direction A. Resulting slot SL, which is a combination of aligned slots in support structure 39, tube 40, tube 42 and tube 40 allows parts 32a, 33a, 35a to move out of the support structure without being impeded, and to be moved back in when connection has to be made with their substitutes.

The insertion of locking pin 46 avoids relative rotation of the tubes 30, 31, 32, 33 and shaft 35 relative to each other, when they have been dismounted from the winder. By avoiding this rotation, the parts 31a, 32a, 33a and 35a of these members, used in the connection to the winder, will maintain their orientation when they are dismounted from the winder. In this way they will be consistent, in their orientation, for a successive alignment and connection, respectively to parts 37', 41', 43a and 42a.

Figure 10:
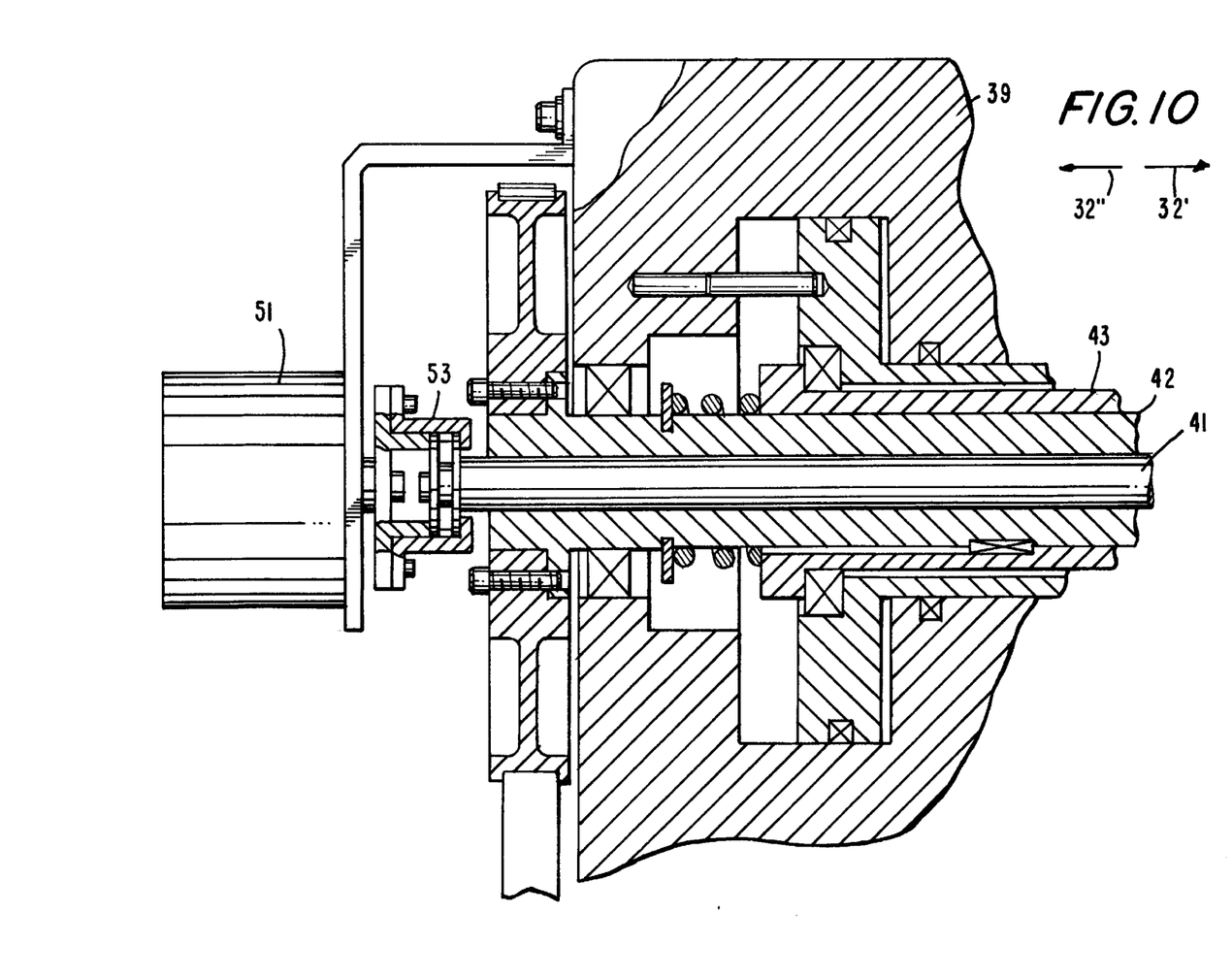
FIG. 10, is a continuation of the longitudinal section view of FIGS. 4 and 5, illustrating the drive apparatus according to the invention.

Shaft 41, tube 42 and tube 43 are driven by traditional drives, such as those shown in U.S. Pat. No. 5,127,594, incorporated by reference above. FIG. 10, which is a continuation of the left of FIG. 5, shows such drives. Cylinder 51 is connected to shaft 41 by means of bearing joint 53. Cylinder 51 can be used to move shaft 41 in direction 32' and 32" and therefore move tube 32 in the same directions.

Proximity switch 47 mounted on support structure 39 is capable of sensing code member 47', which is fixed to enlarged portion 30', and when the latter has been mounted on support structure 39. By sensing the code member 47', it is possible to verify whether the correct tubes and gripper have been correctly substituted in winder. If this situation is not sensed, then the winder should not start any operation, and an alarm for the intervention of an operator should be given.

The fact that tubes are able to be removed and replaced by moving them in direction A, towards and into area Z, greater simplifies the automatic interchangeability of unit 13, and makes it possible to use an automatic pick-and-place device, which can substitute for manual change of the tubes and gripper. Such a pick-and-place device needs to have a gripper, which substitutes a human hand to grasp unit 13 at enlarged potion 30' in order to extract or insert dovetail male portion 30a in corresponding groove 30b. Area Z provides plenty of room for movement of the pick and place device to accomplish this task.

It will be understood that the foregoing is only illustrative of the principles of the invention, and that various modifications can be made by those skilled in the art without departing from the scope and spirit of the invention. For example, the number of tubes and shafts described herein may be reduced or increased as required by the particular dynamo-electric machine component being wound. For example, the use of a brushless stator component which does not have a shaft may be supported by different apparatus than the collet described above. Moreover, the use of greater diameter wires may suggest the omission of tubes for pushing the wire leads behind the commutator tangs. The described embodiments are presented for the purpose of illustration rather than limitation, and the present invention is limited only by the claims which follow.

What is claimed is:

1. Apparatus in a motor winding machine for shielding a dynamo-electric core, comprising:
   shielding assembly comprising a longitudinal member defining a longitudinal axis, a first end configured to shield an end portion of the dynamo-electric core, and a second end; and
   coupling assembly configured to connect the second end of the longitudinal member to a portion of the motor winding machine, while permitting relative movement therebetween in a direction perpendicular to the longitudinal axis.

2. The apparatus defined in claim 1, wherein the shielding assembly further comprises a second longitudinal member defining a longitudinal axis, a first end configured to support an end portion of the dynamo-electric core, and a second end, the apparatus further comprising:
   second coupling assembly configured to connect the second end of the second longitudinal member to a portion of the motor winding machine, while permitting relative movement therebetween in a direction perpendicular to the longitudinal axis,
   wherein the first and second longitudinal members are concurrently movable with respect to the motor winding machine as a unit in a direction perpendicular to the longitudinal axis.

3. The apparatus defined in claim 2, further comprising:
   aligning assembly for releasably aligning the first and second longitudinal members with respect to a single direction perpendicular to the longitudinal axis to allow concurrent movement of the first and second longitudinal members with respect to the motor winding machine.

4. The apparatus defined in claim 3, wherein the aligning assembly further comprises a locking assembly configured to releasably secure the first and second longitudinal members against relative rotation about the longitudinal axis.

5. The apparatus defined in claim 4, wherein the locking assembly comprises an elongated coupling member receivable in openings in each of the first and second longitudinal members, wherein the openings are aligned when the locking assembly and the coupling assembly are also aligned with respect the single direction perpendicular to the longitudinal axis.

6. The apparatus defined in claim 2, wherein the dynamo-electric core is an armature having a shaft, and wherein the first longitudinal member comprises a collet assembly for releasably gripping the armature shaft.

7. The apparatus defined in claim 6, wherein the second longitudinal member annularly surrounds the first longitudinal member.

8. The apparatus defined in claim 1, further comprising:
   rotating assembly configured to rotate the longitudinal member about the longitudinal axis with respect to a portion of the motor winding machine,
   wherein the coupling assembly is configured to restrict relative rotational movement between the longitudinal member and the rotating assembly, while permitting relative movement therebetween in a direction perpendicular to the longitudinal axis.

9. The apparatus defined in claim 1, wherein the coupling assembly is configured to releasably secure the longitudinal member to a portion of the motor winding machine, while permitting relative movement therebetween in a first direction perpendicular to the longitudinal axis when the coupling assembly is released.

10. The apparatus defined in claim 9, wherein the coupling assembly is a cooperating dovetail male portion and a dovetail female portion, releasable by release means to permit relative movement therebetween in said direction.

11. The apparatus defined in claim 1, wherein the coupling assembly comprises a cooperating flange and linear slot oriented in a direction perpendicular to the longitudinal axis to permit relative movement therebetween in said direction.

12. The apparatus defined in claim 1, wherein the shielding assembly further comprises a second longitudinal member relatively movable along the longitudinal axis with respect to the first longitudinal member, the apparatus further comprising:
   translating assembly configured to move the second longitudinal member along the longitudinal axis; and
   second coupling assembly configured to connect the translating assembly and the second longitudinal member against relative longitudinal movement while permitting relative movement therebetween in a direction perpendicular to the longitudinal axis.

13. The apparatus defined in claim 1, wherein the coupling assembly comprises a flange provided to one of the longitudinal member and the motor winding machine, and a cooperating slot provided to the other of the longitudinal member and the motor winding machine, wherein the cooperating slot is open to a direction perpendicular to the longitudinal axis to permit relative movement between the longitudinal member and the motor winding machine in said direction.

14. The apparatus defined in claim 1, wherein the shielding assembly further comprises a second longitudinal member annularly surrounding the first longitudinal member for operating on a portion of the dynamo-electric core and configured for longitudinal movement with respect to the first longitudinal member and connected with the first longitudinal member for rotation therewith, the apparatus further comprising:

translating assembly for moving the second longitudinal member longitudinally and mounted to the motor winding machine for rotatable movement with respect to the longitudinal axis; and second coupling assembly for coupling the second longitudinal member and the translating means against relative longitudinal movement and rotation while permitting relative movement therebetween in a direction perpendicular to the longitudinal axis.

15. The apparatus defined in claim 1, further comprising:

indication means associated with the shielding assembly; and reading means associated with the motor winding machine for reading the indication means.

16. Apparatus in a motor winding machine for shielding a dynamo-electric core, comprising:

a shielding assembly defining a longitudinal axis and comprising a first longitudinal member having a first end for shielding an end portion of the dynamo-electric core and a second end, and a second longitudinal member having a first end for supporting an end portion of the dynamo-electric core and a second end and configured for angular rotation about said longitudinal axis;

rotating assembly configured to rotate the second longitudinal member about the longitudinal axis with respect to a portion of the motor winding machine;

first coupling assembly configured to connect the first longitudinal member to a portion of the motor winding machine, while permitting relative movement therebetween in a first direction perpendicular to the longitudinal axis; and second coupling assembly configured to connect the rotating assembly and the second longitudinal member against relative rotation while permitting relative movement therebetween in a second direction perpendicular to the longitudinal axis, the second direction angularly movable about the longitudinal axis with the rotating assembly and the second longitudinal member, wherein the shielding assembly is movable with respect to the motor winding machine in the first direction perpendicular to the longitudinal axis when the first and second coupling assemblies and the first and second longitudinal members are relatively positioned such that the first and second directions are substantially angularly aligned by relative angular movement of the rotating assembly and the second longitudinal member with respect to the first longitudinal member.

17. The apparatus defined in claim 16, further comprising:

aligning assembly for aligning the first and second longitudinal members with respect to the first direction perpendicular to the longitudinal axis.

18. The apparatus defined in claim 17, wherein the aligning assembly further comprises locking means configured to releasably secure the first and second longitudinal members against relative rotation about the longitudinal axis.

19. The apparatus defined in claim 18, wherein the locking means comprises an elongated coupling member receivable in openings in each of the first and second longitudinal members, wherein the openings are aligned when the first and second coupling assemblies are also aligned with respect to the single direction perpendicular to the longitudinal axis.

20. The apparatus defined in claim 19, further comprising:

detecting device configured to detect whether the elongated coupling member is positioned in the openings in each of the first and second longitudinal members.

21. The apparatus defined in claim 16, wherein the first coupling assembly is a cooperating dovetail male portion and a dovetail female portion, releasable by release means.

22. The apparatus defined in claim 16, wherein the second coupling assembly comprises a cooperating slot and a flange oriented in a direction perpendicular to the longitudinal axis.

23. The apparatus defined in claim 16, wherein the dynamo-electric core is an armature having a shaft, and wherein the first longitudinal member includes a collet assembly for releasably gripping the armature shaft.

24. The apparatus defined in claim 16, wherein the second longitudinal member annularly surrounds the first longitudinal member and a portion of the dynamo-electric core.

25. The apparatus defined in claim 16, further comprising:

a third longitudinal member annularly surrounding the first and second longitudinal members and relatively movable along the longitudinal axis with respect to the first and second longitudinal members, the apparatus comprising:

translating assembly configured to move the third longitudinal member along the longitudinal axis; and third coupling assembly configured to connect the translating assembly and the third longitudinal member against relative longitudinal movement while permitting relative movement therebetween in a direction perpendicular to the longitudinal axis.

26. The apparatus defined in claim 25, wherein the third coupling assembly comprises a cooperating slot and an annular flange oriented in a direction perpendicular to the longitudinal axis.

27. The apparatus defined in claim 25, further comprising:

a fourth longitudinal member annularly surrounding the first longitudinal member for operating on a portion of the armature and configured for longitudinal movement with respect to the first, second and third longitudinal members and connected with first longitudinal member for rotation therewith;

translating assembly for moving the fourth longitudinal member longitudinally and mounted to the motor winding machine for rotatable movement with respect to the longitudinal axis; and coupling assembly for coupling the fourth longitudinal member and the translating means against relative longitudinal movement and rotation while permitting relative movement therebetween in a direction perpendicular to the longitudinal axis.

28. A method for changing a shielding assembly of a winding machine for winding a dynamo-electric core, comprising the steps of:

provinding a shielding assembly defining a longitudinal axis and including a longitudinal member having a first end for shielding an end portion of the dynamo-electric core and a second end;

providing a coupling mechanism to connect the longitudinal member and a portion of the winding machine, while permitting relative movement therebetween in a direction perpendicular to the longitudinal axis; and removing the shielding assembly from the winding machine in the first direction perpendicular to the longitudinal axis.

29. The method defined in claim 28, further comprising:

providing a second shielding assembly defining a longitudinal axis and including a second longitudinal member having a first end for shielding an end portion of the dynamo-electric core and a second end;

aligning the second end of the second longitudinal member with respect to the coupling assembly; and attaching the second shielding assembly by moving the second longitudinal member in the first direction perpendicular to the longitudinal axis.

30. The method defined in claim 28, wherein the step of providing a coupling mechanism comprises providing a coupling mechanism to releasably secure the longitudinal member and a portion of the winding machine, while permitting relative movement therebetween in a first direction perpendicular to the longitudinal axis when the coupling assembly is released.

31. The method defined in claim 28, wherein the step of providing a shielding assembly further comprises providing a shielding assembly including a second elongated member having a first end for supporting an end portion of the dynamo-electric core and a second end, further comprising:

providing a second coupling mechanism to connect the second longitudinal member and a portion of the winding machine, while permitting relative movement therebetween in a second direction perpendicular to the longitudinal axis; and before the step of removing the shielding assembly from the winding machine, positioning the first longitudinal member and the second member about the longitudinal axis such that the first direction and the second direction are substantially aligned.

32. The method defined in claim 28, wherein the step of positioning the first longitudinal member and the second member about the longitudinal axis comprises aligning the first longitudinal member and the second member about the longitudinal axis with an aligning assembly.

33. The method defined in claim 32, wherein the step of positioning the first longitudinal member and the second member about the longitudinal axis further comprises securing the first longitudinal member and the second member against relative rotation about the longitudinal axis.

34. The method defined in claim 33, wherein the step of positioning the first longitudinal member and the second member about the longitudinal axis comprises inserting an elongated coupling member in openings in each of the first and second longitudinal members, wherein the openings are aligned when the first and second coupling assembly are also aligned with respect to the single direction perpendicular to the longitudinal axis.

* * * * *